3,224,550
COMBINING CONVEYOR FOR SIX-PACKS
Biagio J. Nigrelli, Northbrook, Wendell E. Standley, Lake Forest, Richard B. Wittmann, Chicago, and Joseph V. Ferraro, Niles, Ill., assignors to Johns-Nigrelli-Johns, Inc., Skokie, Ill., a corporation of Illinois
Filed Nov. 29, 1963, Ser. No. 326,929
9 Claims. (Cl. 198—32)

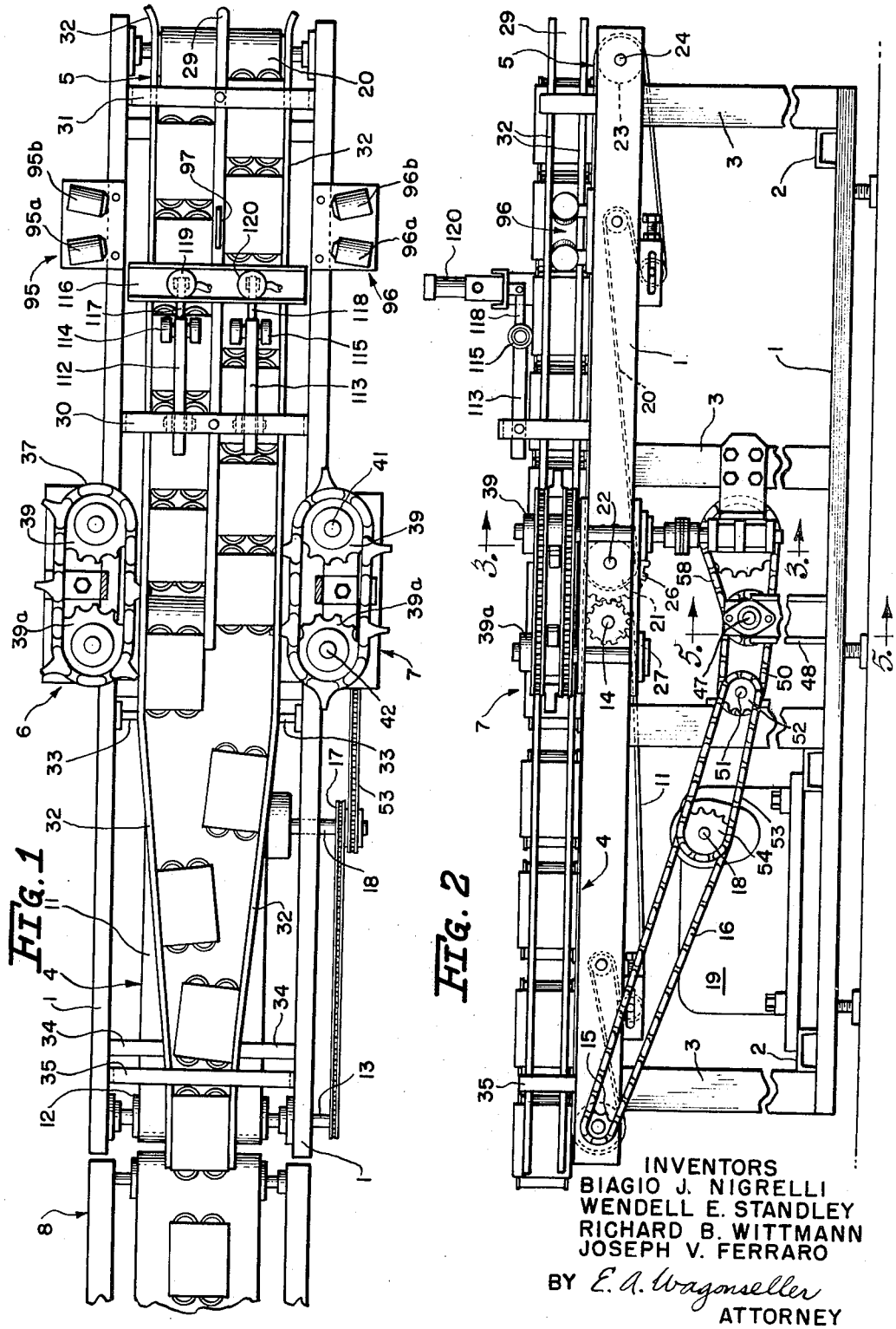
Dec. 21, 1965   B. J. NIGRELLI ETAL   3,224,550
COMBINING CONVEYOR FOR SIX-PACKS
Filed Nov. 29, 1963   3 Sheets-Sheet 1
INVENTORS
BIAGIO J. NIGRELLI
WENDELL E. STANDLEY
RICHARD B. WITTMANN
JOSEPH V. FERRARO
BY E. A. Wagonseller
ATTORNEY Dec. 21, 1965
B. J. NIGRELLI ETAL
3,224,550
COMBINING CONVEYOR FOR SIX-PACKS
Filed Nov. 29, 1963
3 Sheets-Sheet 2
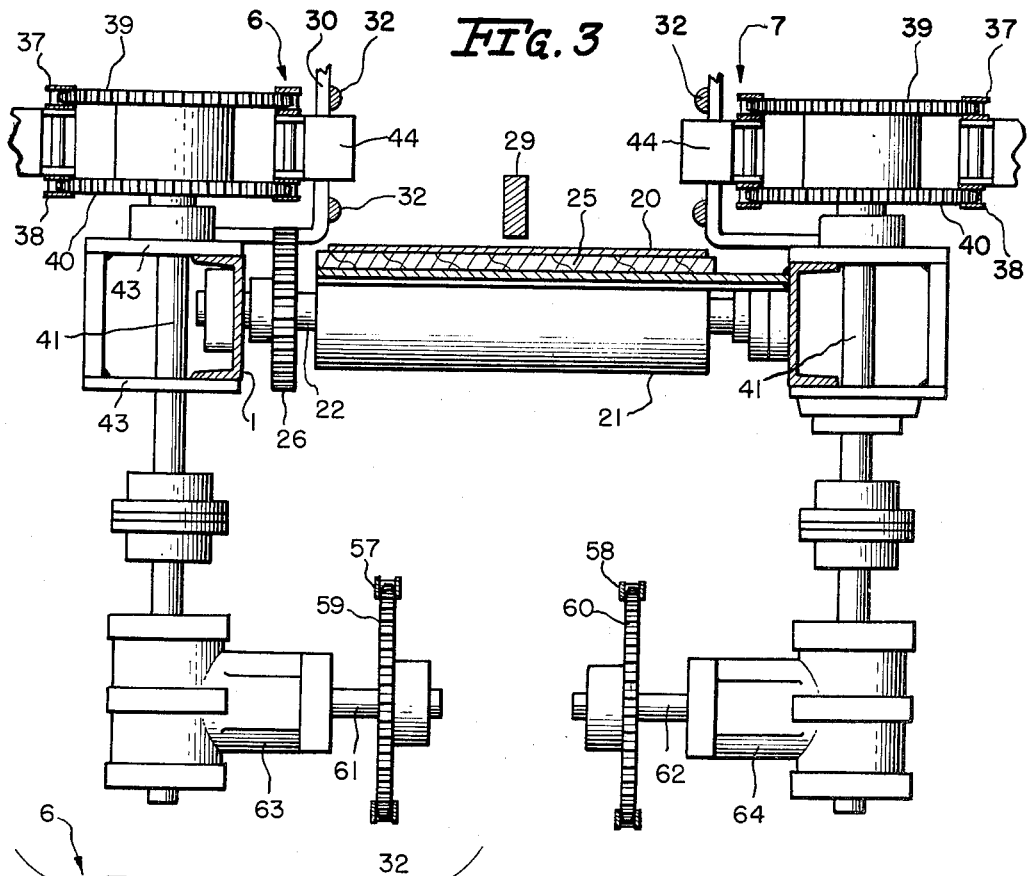
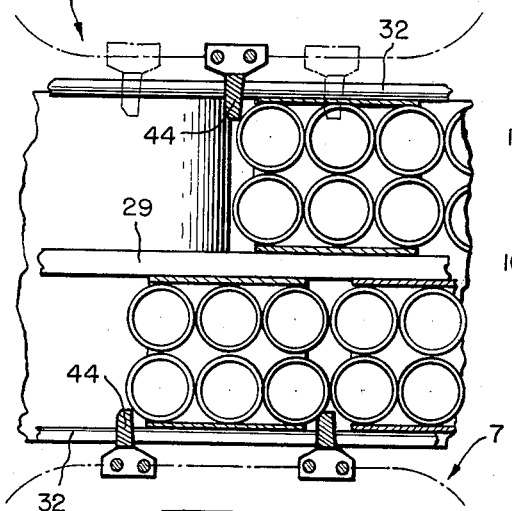
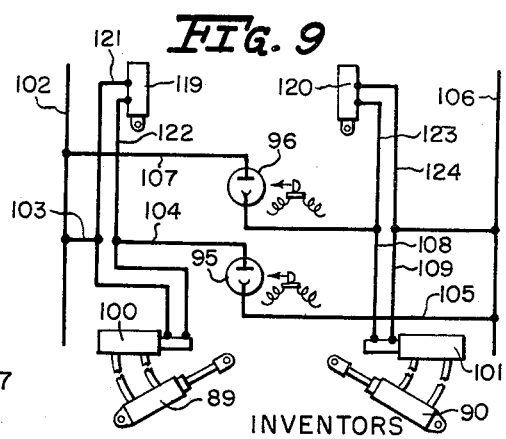
INVENTORS
BIAGIO J. NIGRELLI
WENDELL E. STANDLEY
RICHARD B. WITTMANN
JOSEPH V. FERRARO
BY E. A. Wagonseller
ATTORNEY

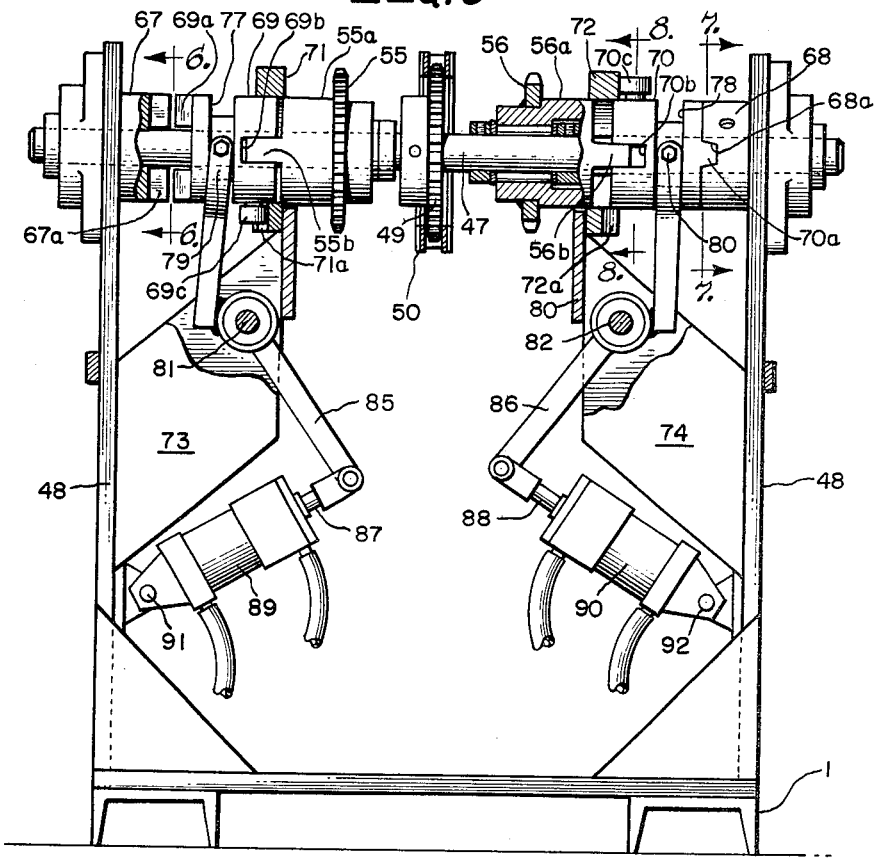
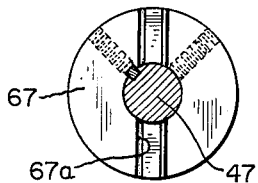
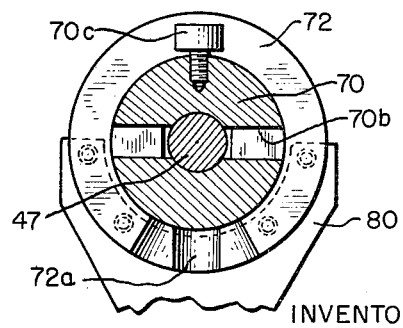
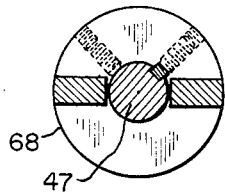
INVENTORS
BIAGIO J. NIGRELLI
WENDELL E. STANDLEY
RICHARD B. WITTMANN
JOSEPH V. FERRARO
BY E. A. Wagonseller
ATTORNEY United States Patent Office 3,224,550
Patented Dec. 21, 1965

The present invention relates to mechanism for arranging articles on a conveyor and control means therefor, and more particularly to mechanism by which articles advanced on a plurality of conveyors may be fed in a controlled arrangement onto a single line conveyor.

An important object of the invention is to provide feeding mechanism by which articles advanced in abutted relation from two conveyors may be fed alternately onto a single-line conveyor, combined with effective control means whereby, when the supply of articles in one of the lines of abutted articles is temporarily suspended, the feeding mechanism for such line will be stopped, and when the supply of articles on such line has been replenished, the feeding means will be started in proper synchronized relation to its companion feeding means.

An additional object of the invention is to provide highly efficient and accurate control means for the synchronized feeding mechanism whereby either feeding mechanism may be stopped when required and restarted in every instance in proper phase with its companion feeding mechanism.

Additional and more specific objects and advantages of the present invention will become apparent as the description proceeds.

In the drawings:

FIGURE 1 is a plan view of the conveyor system showing two lines of articles being fed to a single line and showing the feeding mechanism for each of such two lines;

FIGURE 2 is a view in side elevation, with certain parts of the mechanism being omitted, showing the principal parts of the driving arrangement for the conveyor system;

FIGURE 3 is a vertical cross-sectional view, taken along line 3—3 of FIGURE 2 looking in the direction of the arrows, showing details of the drive for the separate feeding mechanisms;

FIGURE 4 is a fragmentary, detail plan view, showing the article engaging fingers of the feeding mechanisms in related positions;

FIGURE 5 is a vertical-sectional view, taken along line 5—5 of FIGURE 2, looking in the direction of the arrows, showing details of the clutch control means for the separate feeding mechanisms;

FIGURES 6, 7 and 8 are detailed cross-sectional views taken respectively along lines 6—6, 7—7 and 8—8 of FIGURE 5; and FIGURE 9 is a schematic view of the wiring for controlling the clutch mechanism shown in FIGURE 5.

The mechanism of the present invention is particularly useful in situations in which the packages produced by two machines are to be combined into a single conveyed line to be operated upon by a machine having a greater output capacity. More specifically, the drawings illustrate packages of six cans each retained in wrap-around type cartons. The cans are packed in two rows with the two end cans at each end of the package projecting outwardly beyond the end of the carton wrapper. The so called "six-packs" are advanced in single file along two conveyed lines, either on a single belt conveyor or on separate belts. The six-packs in each line are conveyed abutted end-to-end and are fed alternately off the two conveyed lines into a single line moving at approximately twice the speed of the feeding or delivery conveyors. Each delivery conveyor line has associated therewith a feeding mechanism of substantially identical form but arranged symmetrically out of phase with each other. By this arrangement the six-packs will be fed alternately from the two delivery conveyors onto the receiving conveyor. By operating the receiving conveyor somewhat in excess of twice the speed of the delivery conveyors the receiving conveyor is able to handle the full output of the delivery conveyors.

As the invention is applicable generally to ariticles other than the packages holding six cans, such packages will for convenience generally be referred to merely as articles.

In practical installations there are times when one or the other of the lines of articles on the delivery conveyors will be temporarily depleted, and shortly thereafter the flow of articles will be resumed. Such resumption of the flow of articles is usually irregular and unless the feeding is properly controlled, jamming of the articles in the receiving line could occur. It is therefore desirable, when the flow of articles in one line is interrupted, that the feeding mechanism for such line be stopped while there are still a few abutted articles in line back of the feeding mechanism. After the depleted line begins to be replenished, it is important that the feeding operation is resumed so that the feeding mechanism has been stopped will resume operation properly and continue symmetrically out of phase with the companion feeding mechanism. It is a feature of the invention to provide means which will cause the feeding units to stop when a feed line is depleted and to be again started in proper relationship with the companion feeding unit.

Referring more particularly to the drawings, the machine is suitably supported on a base comprising longitudinal frame members 1, 1, transverse members 2, 2 and vertical members 3, 3. A receiving conveyor section, indicated as a whole at 4, is supported on the left hand portion of the frame, as viewed in FIGURES 1 and 2, and a delivery conveyor section, indicated as a whole at 5, is supported on the right hand section. Feeding mechanisms for controlling the flow of articles from the delivery conveyor section are each indicated as a whole at 6 and 7.

As shown in FIGURE 1, a suitable carry-off conveyor, indicated as a whole at 8, may be arranged at the discharge end of the receiving conveyor to conduct the articles to the next operating machine. In the presently illustrated system, conveyor 8 would be used to convey the packages to a case or tray loader which inserts a plurality of packages into such case or tray.

The receiving conveyor 4, as herein shown, comprises a suitably supported endless belt 11 passing over a forward roll 12, fixed on a shaft 13, and over a rear roll fixed on a shaft 14 journalled in the upper longitudinal frame member 1. The shaft 13 has a sprocket 15 over which passes a sprocket chain 16 driven by a sprocket 17 on a shaft 18 driven through suitable gearing by a motor in casing 19.

The feeding or delivery conveyor may broadly be considered as two separate conveyors but for convenience is formed with a single belt 20 which at its discharge end passes over a roll 21 on a shaft 22. At its receiving end, the belt 20 passes around a roll 23 on shaft 24. As shown in FIGURE 3, the belt 20 may be supported upon a plate 25 of any suitable material over which the belt is readily slidable. For the purpose of driving the belt 20 a spur gear 26 is secured on the roll shaft 22 and meshes with a smaller gear 27 on shaft 14 driven by the conveyor belt 11. The driving ratio is such that the belt 20 has a lineal speed slightly less than one-half the speed of the belt 11.

For accuracy in conducting two lines of articles along the belt 20 a vertically positioned divider plate 29 is positioned centrally of the belt and extends forwardly sufficiently to extend a short distance over the end of belt 11. This divider plate may be supported, as shown, on supplemental frame elements 30 and 31. Upper and lower side guide rails 32, 32 extend from the receiving end of belt 20 forwardly past the feeding mechanisms and then are bent to converge at the discharge end of belt 11 to a width which will accommodate a single line of articles. The side guides are supported above the belt 11 by side brackets 33, 33 and by supplemental frame element 35.

The details of the feeding mechanisms 6 and 7 will now be described. As these are substantially identical a description of one will suffice. Referring to FIGURES 1, 2 and 3 the feeding mechanism 7 comprises upper and lower sprocket chains 37 and 38 which pass around spaced, upper and lower sprockets 39, 39a and 40, 40a. The sprockets are mounted on spaced, vertical shafts 41, 42 journalled in upper and lower bracket members 43, 43 secured to longitudinal frame member 1.

The upper and lower chains 37 and 38 support between them a plurality of article engaging elements, which will be referred to as fingers, indicated at 44, 44. These fingers are preferably somewhat tapered at their outer edges and are secured at their rear or base portions to the faces of vertically aligned links of the upper and lower sprocket chains 37 and 38. The link pins for the links that support the fingers are of sufficient length to join both upper and lower links thus making a unitary structure by which the fingers will be maintained outwardly extended and at right angles to the direction of travel of articles on the conveyors. As best shown in FIGURES 3, the fingers are disposed to extend between the upper and lower side guide rails 32, 32. Thus, as the fingers advance with the movement of the chains 37 and 38 the free end portions of the fingers are in positions to engage between the surface of one of the trailing cans in one six-pack and one of the leading cans in an adjacent, abutted six-pack. See FIGURES 1 and 4.

In the present construction the feeding mechanisms are each formed with six article engaging fingers which are spaced apart, as shown in FIGURES 1 and 4, so that one finger will engage forwardly of a given article while the next finger in sequence will engage rearwardly of the same article and forwardly of an adjacent abutted article. The size of the sprockets employed in the feeding device is chosen so that the fingers will swing in accurately between adjacent leading and trailing cans in abutted packages. It is to be understood that other arrangements of movable, article engaging elements are within the contemplation of the present invention. The important feature is to provide an arrangement in which one engaging element, in advancing, will release a package while a second engaging element is in position to retain an oncoming abutted package and will likewise release its package when it has advanced sufficiently.

The two article feeding mechanisms are designed to be advanced at the same speed and, as shown in FIGURE 1, are arranged symmetrically out of phase, whereby articles may be released alternately from the delivery conveyors to the receiving conveyor.

The drive for the feeding mechanisms and means for controlling same will now be described. As illustrated in FIGURES 2 and 5, a transmission shaft 47 is journalled in suitable bearings in supplemental frame members 48, 48 on lower base frame member 1. A sprocket 49 is keyed centrally on shaft 47 and is driven by a sprocket chain 50 passing around a sprocket on jack shaft 51 having a second sprocket 52 thereon, driven by chain 53 passing around a sprocket 54 secured on the main drive shaft 18. Thus, while the conveyors are being operated, the shaft 47 will be in continuous rotation.

Two driving sprockets 55 and 56 are mounted on the shaft 47 for selective connection thereto to rotate therewith. Sprocket chains 57 and 58 pass around the respective sprockets 55 and 56 and also around the sprockets 59 and 60 which are keyed to shafts 61 and 62 respectively leading into gear housings 63 and 64 containing suitable gears for connection with the vertical shafts 41, 41 which operate the feeding mechanisms. By means of the transmission gearing just described, the feeding mechanisms may be driven independently and at the same speed from the motor through the intermediate drive shaft 47. The lineal speed at which the feeding mechanisms are driven is preferably slightly less than the speed of the belt 20.

Means are provided for selectively engaging the sprockets 55 and 56 with the drive shaft 47 and associated with such means are means for assuring that the feeding mechanisms although stopped and started at irregular intervals will always be operated in synchronism, that is, they will always be operated symmetrically out of phase. For this purpose there are fixed near opposite ends of the shaft 47 two clutch parts 67 and 68. These are keyed to the shaft 47 to rotate constantly therewith.

Slidable clutch parts 69 and 70 are mounted to rotate freely upon shaft 47 and to cooperate respectively with clutch parts 67 and 68. Clutch parts 69 and 67, and likewise parts 70 and 68, may be separately locked together to cause the slidable parts to rotate with parts 67 and 68 which are keyed to shaft 47. For this purpose the constantly rotating clutch parts are formed with notches in their vertical faces and the slidable parts are formed with tangs that are designed to enter such notches. As shown in FIGURE 5 (the machine being at rest) the notch 67a in part 67 is disposed vertically and the notch 68a in part 68 is disposed horizontally. In other words these notches are disposed at right angles to each other. The slidable clutch part 69 has a pair of aligned tangs on the face of the part adjacent the constantly rotating part 67. These aligned tangs constitute in effect a single tang 69a and for convenience will be referred to as such. The tang 69a is receivable into the notch 67a when the part 69 is caused to slide against the part 67. Similarly, part 70 has a tang 70a which is engageable within the notch 68a.

When the respective tangs of the slidable clutch parts are received into their notches, the slidable clutch parts will be caused to rotate and will thus cause rotation of the respective sprockets with which they are associated. To accomplish this the slidable clutch parts 69 and 70 have relatively elongated notches 69b and 70b formed in their faces opposite their tang elements. These notches will, of course, be interrupted by the shaft 47 but, in effect, a single notch in each part is provided. Slidable in these notches are respective prongs extending from the hubs of the driving sprockets 55 and 56. The hubs for these sprockets are indicated at 55a and 56a and the prongs are indicated respectively at 55b and 56b. The arrangement of the prongs and notches is such that the slidable clutch parts 69 and 70 remain locked to their companion sprocket hubs in either position of the slidable parts.

Means are provided for sliding the clutch parts and for holding them in either position. The holding means will first be described. This comprises a fixed, cam-like ring member located near the edges of the sprocket hubs and the adjoining faces of the slidable clutch parts. These are indicated at 71 and 72 and are supported on separate, inwardly projecting, double-wall brackets 73 and 74 secured on opposite frame members 48, 48. In one part of the ring members 71 and 72 there are provided notches indicated respectively at 71a and 72a into which follower rollers 69c and 70c are respectively receivable. It is to be noted that when the follower rollers are riding along the unnotched face of the ring members the slidable clutch part is not free to move in the direction necessary to withdraw its tang out of the notch of the constantly rotatable clutch part (67 or 68). However, when the slidable clutch part has been rotated sufficiently to bring its follower roller into position to move into the notch, the tang on the slidable clutch part may be removed from its notch by sliding the slidable part over so that the follower roller will drop into the notch on the fixed ring member.

The mechanism for moving the slidable clutch parts will now be described. Each of these parts is formed with a circumferential groove indicated at 77 for clutch part 69 and 78 for clutch part 70. Fitted into these grooves are yoke members of conventional form indicated respectively at 79 and 80. The lower end of each yoke is rigidly secured to a member mounted on a pivot element. These are indicated at 81 and 82 mounted on separate pivot pins 83 and 84 held in the plates of brackets 73 and 74. The rockably mounted members 81 and 82 have rigid arms indicated respectively at 85 and 86 secured thereon, projecting downwardly and having secured to their lower end piston rods 87 and 88 respectively having pistons thereon fitted into the respective cylinders 89 and 90 designed to be operated by compressed air through respective pairs of conduits as indicated. The cylinders are pivotally mounted at their lower ends at 91 and 92.

When air under pressure is admitted below either of the pistons to force the piston rods upward, as viewed in FIGURE 5, the slidable clutch part will be urged to move outwardly. The clutch part, however, can be moved laterally only when its tang is in registry with the groove in the constantly rotating part. Therefore, if when pressure is applied to move the slidable clutch part and the tang is not in register with its notch, the tang simply slides on the face of the constantly rotating part until the notch moves into registry with the tang.

Conversely, when air under pressure is admitted above either piston, tending to move the slidable part inwardly, unless the follower roller is exactly at its receiving notch, it will ride around the vertical face of the fixed ring member until the roller reaches the notch, whereupon it will snap into the notch, causing the sprocket 55 or sprocket 56, as the case may be, to be stopped instantly. This causes the feeding mechanism to be stopped with its fingers engaging the leading and trailing surfaces of an article, as illustrated in the full line position of the fingers as seen in FIGURES 1 and 4 for unit 7, or in the broken line position of the fingers of unit 6 as shown in FIGURE 4. In order to obtain this result the article engaging fingers are so positioned with respect to the follower rollers that, when either one of the rollers is held in its retaining notch, the fingers will assume the positions referred to above. It is thus possible that both sets of fingers may be stopped exactly opposite each other. However, even if both lines are replenished at the same time, they cannot start simultaneously due to the fact that the notches 67a and 68a of parts 67 and 68 are disposed 90° apart, and the feeding units cannot be started until their respective tangs are received into their notches.

The control means for the feeding mechanisms and the wiring therefor will now be described. At a point which is a number of package lengths upstream from the feeding units, herein shown as about five package lengths, there are arranged two photoelectric switches. These switches are indicated at 95 and 96 and each includes a light source and a receiver indicated at 95a, 95b and 96a, 96b, with a double surface mirror 97 located centrally of conveyor section 5 to reflect the light beams from the sources back to the receivers. In normal operation, with lines of abutted packages extending upstream beyond the photocell switch the light beams will be constantly interrupted and the coils of the solenoid valves will remain deenergized.

Referring to FIGURE 9, there is shown connected to each of the cylinders 89 and 90 a solenoid valve, as indicated at 100 and 101 respectively. Any suitable type of solenoid valve may be employed, such as a four-way, spring-return valve. To energize the coil of valve 100 current is brought from main conductor 102, through wire 103, through the coil of the solenoid, then through wire 104 to the photocell switch 95 and wire 105 to the other main conductor 106. To energize the coil of valve 101 current is brought from main conductor 102, through wire 107, through the photocell switch, thence through wire 108, then through the coil and through wire 109 to main conductor 106.

While the solenoid coils remain deenergized air pressure will be exerted through the solenoid valves and back of the pistons in cylinders 89 and 90. This tends to extend the piston rods, thus exerting pressure on the yokes 79 and 80 to keep the slidable clutch parts 69 and 70 with their tangs firmly in their receiving slots in the constantly rotatable clutch parts 67 and 68.

In the event one of the abutted lines of articles moving on conveyor section 5 becomes depleted, for example the line controlled by feeding mechanism 6, the beam of photocell switch 95 will become established on the receiver which will cause the switch to be closed to energize the coil of solenoid switch 100. This will reverse the position of the valve and cause the pressure against the piston in cylinder 89 to be reversed, tending immediately to shift the slidable clutch part away from engagement with the constantly rotatable part 67. The slidable clutch part 69 cannot slide, however, until the follower roller 69c has moved around the surface of the fixed ring member 71 to allow the roller to snap into the notch 71a. As soon as the slidable member has moved to this position the rotation of sprocket 55 will be stopped which will cause stoppage of the feeding mechanism 6 with two of the fingers embracing a package centrally of the length of the feeding mechanism. Such package engaging fingers will thus be in the positions shown in broken lines in FIGURE 4.

The air pressure on the piston in cylinder 89 remains effective to hold the slidable clutch part in its locked position as long as the photocell beam remains on the receiver. Then, as soon as the supply of packages is replenished and the light beam for photocell switch is broken, the switch will be opened and the coil of the solenoid valve 100 will be deenergized thus allowing the spring of the solenoid to return the valve to change the air pressure so it will again be exerted below the piston. This immediately tends to move the slidable clutch part 69 back toward the constantly rotatable part 67. However, movement of part 69 cannot take place until the notch 67a of the rotatable part becomes aligned with the tang 69a, allowing the tang to snap into the notch. This causes immediate rotation of the sprocket 55 with the result that feeding mechanism 6 will resume its forward travel. As this will occur at the point where the retaining fingers are symmetrically out of phase with the fingers of feeding mechanism 7, it will cause the release of the package that has been held by feeding mechanism 6 at the proper point to avoid interference with the preceding and the following packages released by feeding mechanism 7.

It is to be noted that when one line or the other on conveyor section 5 is stopped, the belt 20 will slip beneath the packages that remain at rest on the belt and which are held back by the inactive feeding mechanism. As soon as a deactivated feeding unit is restarted the finger that has been restraining the leading package advances and, in passing outwardly around the forward sprockets, will be removed from in front of the package. While the finger is advancing to the point at which it will no longer restrain the package, such package will be propelled by the succeeding package and the conveyor belt 20 to a point where the friction of the faster moving belt 11 on the bottom of the package will be sufficient so that belt 11 will take control of the package and thereafter the package will advance at the speed of the belt 11. This is illustrated in FIGURE 1 in which the package just released by feeding unit 6 has had its movement accelerated by the faster belt 11. Thus, by the time the leading package held by unit 7 is released, the package previously released by unit 6 will be sufficiently ahead of such package so that there will be no interference and therefore no jamming in the restricted section between the converging guide rails 32.

In order to assure that the packages approaching the feeding mechanisms will stay in abutted position, selectively operable hold-down or pressure applying devices are preferably arranged above the conveyed lines of packages. As shown in FIGURES 1 and 2 these devices comprise bars 112 and 113 pivotally mounted near one end on the supplemental frame element 30 and carrying near their other ends pairs of rollers indicated at 114 and 115 respectively which are designed to bear upon the top surfaces of the packages.

The roll supporting ends of the bars are designed to be lifted and for this purpose a supplemental frame element 116 is arranged transversely over conveyor section 5 and on this frame there are supported solenoids to lift each bar. Each of the bars is formed with an extended portion projecting to a point beneath frame 116, indicated at 117 and 118. Connected to the ends of these extended portions are short, downwardly projecting rods formed on the armatures of the solenoids, actuated by the solenoid windings enclosed in casings 119 and 120. Energization of the solenoids will lift the armatures and raise the rollers, while deenergization of the solenoids permits the rollers to be lowered so as to contact the tops of the packages passing on the conveyor belt 20. In the event pressure on the packages is required beyond that produced by the weight on the bars and rollers the bars may be arranged to be urged downward by spring pressure.

It is desirable to remove the pressure on the package beneath the hold down rolls in the event of necessary stoppage of the feeding mechanism due to depletion of a row. This prevents undue wear on the bottom surface of the package by the belt slipping beneath it. For this purpose the solenoids which lift the rolls may be energized simultaneously with energization of the coils of the solenoid valves 100 and 101. As shown in FIGURE 9, the solenoid in casing 119 may be connected in parallel with the circuit for solenoid valve 100 through wires 121 and 122 connected to wires 103 and 104. Similarly, the solenoid in casing 120 may be connected in parallel with the circuit for solenoid valve 101 through wires 123 and 124 connected to wires 108 and 109. Thus, as at the same time either feeding mechanism is stopped by actuation of the solenoid valves 100 or 101 the rolls for the appropriate conveyed line of packages will be lifted and held until the feeding mechanism for such conveyed line is restarted.

By the use of the roller hold-down devices the group of four packages (as herein shown) immediately upstream from the feeding mechanisms will be caused to move forward promptly, responsive to the release of the leading package that was being held due to the stoppage of the feeding mechanism. Due to the fact that the speed of the feeding mechanism is slower than that of the belt 20, the oncoming packages upstream from the hold-down devices will have time to catch up with the preceding packages and thus present a solid abutted line after a few moments of operation.

From the foregoing it is apparent that effective mechanism is provided which may be utilized to combine two lines of abutted articles into a single conveyed line during normal operation. By reason of the control means for the feeding mechanisms disclosed herein, either feeding mechanism may be shut down temporarily and the other line may continue feeding to the receiving conveyor. When normal operation of the depleted line is resumed, the articles fed from such line to the receiving conveyor will be delivered in proper timed relation to the line that has continued in motion.

While the present description sets forth a preferred embodiment of the invention, numerous changes may be made in the construction without departing from the spirit of the invention, and it is therefore desired that the present embodiment be considered in all respects as illustrative and not restrictive, reference being had to the appended claims rather than to the foregoing description to indicate the scope of the invention.

We claim:

1. In a mechanism for arranging upstanding, uniform sized articles in a single conveyed line, which articles are delivered from two feeding or delivery lines, the combination of a receiving conveyor and two delivery conveyor sections arranged for the transfer of articles from the delivery sections to the receiving conveyor, said delivery conveyor sections comprising movable supporting means on which the articles are disposed in aligned, abutted relation, means for continuously driving the delivery conveyor means, separate feeding means for each line of abutted articles on the delivery conveyor means, means for selectively starting and stopping said separate feeding means while the supporting conveyor means continues to operate and slide beneath an abutted line of articles, means arranged in spaced relation upstream from the separate feeding means for applying downward pressure on the articles to hold them firmly against the supporting conveyor means, whereby starting of the line of abutted articles after a period of stoppage thereof on the moving supporting conveyor means will be facilitated, and means by which the downward pressure on the articles of either conveyed line is rendered inoperative simultaneously with the stoppage of the feeding means for such conveyed line.

2. A mechanism, as defined in claim 1, in which the means for applying downward pressure on the articles on either delivery line is controlled to apply such pressure only during active operation of the feeding means for such conveyed line.

3. A mechanism, as defined in claim 1, in which such means for applying downward pressure is again rendered operative upon restarting of said feeding means.

4. A mechanism, as defined in claim 1, in which each pressure applying mechanism comprises a vertically movable roller element arranged over the individual conveyed lines to engage the upper surface of one of the articles spaced a short distance upstream from the feeding means.

5. A mechanism for arranging upstanding articles in a single conveyed line which are delivered from two feeding lines, the articles being of the type of generally rectangular, uniform sized packages having curved contours at their vertical corners by reason of containing rows of upright, curved-contoured cans or the like with the end cans projecting from the ends of the package and affording entry of article-engaging fingers within the recesses between the ends of the abutted articles, such mechanism comprising, in combination, delivery conveyor means for advancing two lines of abutted articles of the type described, a receiving conveyor means arranged to receive articles from the delivery conveyor means and operative to effect the advance of a single row of articles therealong to a discharge point, separate feed mechanisms of elongated, similar form, arranged symmetrically adjacent opposite sides of the receiving conveyor means to control the movement of the articles delivered onto such receiving conveyor means, each feed mechanism having a plurality of movable, article-retaining fingers spaced to engage the leading and trailing ends of the abutted articles by entering the spaces between the curved contours of the articles, thereby to control their advancing movement or to retain an article if the feed mechanism is held stationary, means independent of the movement of the articles for positively advancing said article-retaining fingers uniformly at a speed less than one-half the speed of movement of articles advancing on the receiving conveyor means, the fingers of the separate feed mechanisms being symmetrically out of phase, whereby articles released by such feed mechanisms will be released alternately on the receiving conveyor means, means for selectively interrupting the action of the advancing means for either feed mechanism in the event that the number of abutted articles in the line delivered to it by the delivery conveyor means is reduced to a predetermined minimum, and means for reactivating the deactivated feed mechanism, maintaining its out-of-phase relationship with the other feed mechanism, upon replenishment of the line of abutted articles delivered to it by the delivery conveyor means.

6. A mechanism for arranging upstanding articles in a single conveyed line which are delivered from two feeding lines, the articles being of the type of generally rectangular, uniform sized packages having curved contours at their vertical corners by reason of containing rows of upright, curved-contoured cans or the like with the end cans projecting from the ends of the packages and affording entry of article engaging fingers within the recesses between the ends of the abutted articles, such mechanism comprising, in combination, constantly operable delivery conveyor means for advancing articles of the type described in two separate lines in abutted relation, a receiving conveyor means operable to effect the advance of a single row of articles thereon to a discharge point, separate feed mechanisms of elongated, similar form arranged symmetrically at the opposite sides of the receiving conveyor means at the receiving end thereof and extending rearwardly of the discharge end of the delivery conveyor means and forwardly of the receiving end of the receiving conveyor means to control the release of the articles to advance on the receiving conveyor means, each feed mechanism having a plurality of movable, article-retaining fingers spaced to engage the leading and trailing ends of the abutted articles by entering the spaces between the curved contours of the articles, thereby to control their advancing movement on the receiving conveyor means or to retain an article thereon if the feed mechanism is held stationary, means independent of the movement of the articles for positively advancing said article-retaining fingers uniformly at a speed less than one-half the speed of the articles advancing on the receiving conveyor means, the fingers of the separate feed mechanisms being symmetrically out of phase, whereby articles released by such feed mechanisms will be released alternately on the receiving conveyor means, means for selectively interrupting the action of the advancing means for either feed mechanism in the event that the number of abutted articles on its delivery conveyor means is reduced to a predetermined minimum, and means for reactivating the deactivated feed mechanism, maintaining its out-of-phase relationship with the other feed mechanism, upon replenishment of the supply of abutted articles on its delivery conveyor means.

7. A mechanism for arranging upstanding articles in a single conveyed line which are delivered from two feeding lines, the articles being of the type of generally rectangular, uniform sized packages having curved contours at their vertical corners by reason of containing upright, curved-contoured cans or the like projecting from the ends of the packages and affording entry of article-engaging fingers within the recesses between the adjacent ends of the abutted articles, such mechanism comprising, in combination, two constantly operable delivery conveyor sections, a receiving conveyor section arranged to receive articles from the delivery conveyor sections and operative to effect the advance of a single row of articles therealong to a discharge point, the articles being advanced along the delivery conveyor sections in single line, abutted relation, separate feed mechanisms of elongated, similar form arranged symmetrically at opposite sides of the receiving conveyor section at the receiving end thereof and extending forwardly beyond such receiving end to control the release of the articles in the separate lines to advance on the receiving conveyor section, each feed mechanism having a plurality of movable, article-retaining fingers spaced to engage the leading and trailing ends of the abutted articles by entering the recesses between the curved contours at the vertical corners of the articles, thereby to control their advancing movement on the receiving conveyor section or to retain an article thereon if the feed mechanism is held stationary, means for positively advancing both sets of article-retaining fingers uniformly at a speed less than one-half the speed of movement of articles advancing on the receiving conveyor section, the fingers of the separate feed mechanisms being symmetrically out of phase, whereby articles released by such feed mechanisms will be released alternately on the receiving conveyor section, a common drive mechanism for the two feed mechanisms, said common drive mechanism including separate, constantly driven parts, and means for selectively connecting and disconnecting the feed mechanisms independently to one of said driven parts, whereby either of said feed mechanisms may temporarily be rendered inactive to prevent its engaged article from advancing while on the receiving conveyor section, such means including means for reconnecting the deactivated feed mechanism to its constantly driven part only in its out-of-phase relationship with the other feed mechanism.

8. A mechanism, as defined in claim 7, in which the common drive mechanism for the feeding units comprises a constantly rotatable shaft having fixed thereon constantly rotatable clutch parts, independent drive transmission means between said shaft and the respective feeding units, each of said transmission means including a clutch part freely rotatable on and slidable along the shaft, and means providing for locking engagement between such slidable part and the constantly rotatable clutch part when brought together.

9. A mechanism, as defined in claim 8, in which means are provided for locking such freely rotatable clutch part in fixed position upon the release of its locking engagement with the constantly rotatable clutch part.

References Cited by the Examiner
UNITED STATES PATENTS

| | | | |
|---|---|---|---|
| 2,108,522 | 2/1938 | Bergmann | 198—32 |
| 2,529,620 | 10/1950 | Marnach. | |
| 2,996,855 | 8/1961 | Bergmann | 198—32 |
| 3,144,119 | 8/1964 | Nigrelli | 198—32 |

SAMUEL F. COLEMAN, *Primary Examiner.*

RICHARD E. AEGERTER, *Examiner.*